United States Patent [19]

Wood, III

[11] 4,348,044
[45] Sep. 7, 1982

[54] ARTICLE GRIPPING APPARATUS

[75] Inventor: David B. Wood, III, West Chester, Ohio

[73] Assignee: Cincinnati Milacron Inc., Cincinnati, Ohio

[21] Appl. No.: 195,756

[22] Filed: Oct. 10, 1980

[51] Int. Cl.³ .............................................. B66L 1/42
[52] U.S. Cl. ..................................... 294/88; 294/115; 294/118
[58] Field of Search ................. 294/88, 116, 87 R, 87, 294/22, 24, 106, 115, 118; 269/32, 34, 257, 264

[56] References Cited

U.S. PATENT DOCUMENTS

| 3,588,165 | 6/1971 | Varga | 294/88 |
| 3,790,205 | 2/1974 | Wenz | 294/88 |
| 4,211,123 | 7/1980 | Mack | 294/88 |

Primary Examiner—James B. Marbert
Attorney, Agent, or Firm—Thomas M. Farrell

[57] ABSTRACT

An article gripping apparatus has a housing moved into proximity with a part to be gripped. A clamp finger is pivoted on the housing by an actuator biased by a first "stiff" spring reacting against the housing. In the clamped position, an interference wedge block is biased against the clamp finger by a second, "soft", spring reacting against the actuator to prevent the finger from opening under the influence of an external force. A piston portion of the actuator is contained in a cylinder portion of the wedge block. When pressurized fluid is ported to the cylinder cavity, the wedge block is first retracted from the clamp finger, overcoming the second, "soft", biasing spring. When the wedge block contacts a fixed shoulder in the housing, the actuator piston is then forced away from the shoulder, overcoming the first, "stiff", biasing spring, pivoting the finger to an "open" position. Release of the fluid pressure will sequentially re-bias the actuator and wedge block, pivoting the finger to a "closed" position and locking it.

8 Claims, 5 Drawing Figures

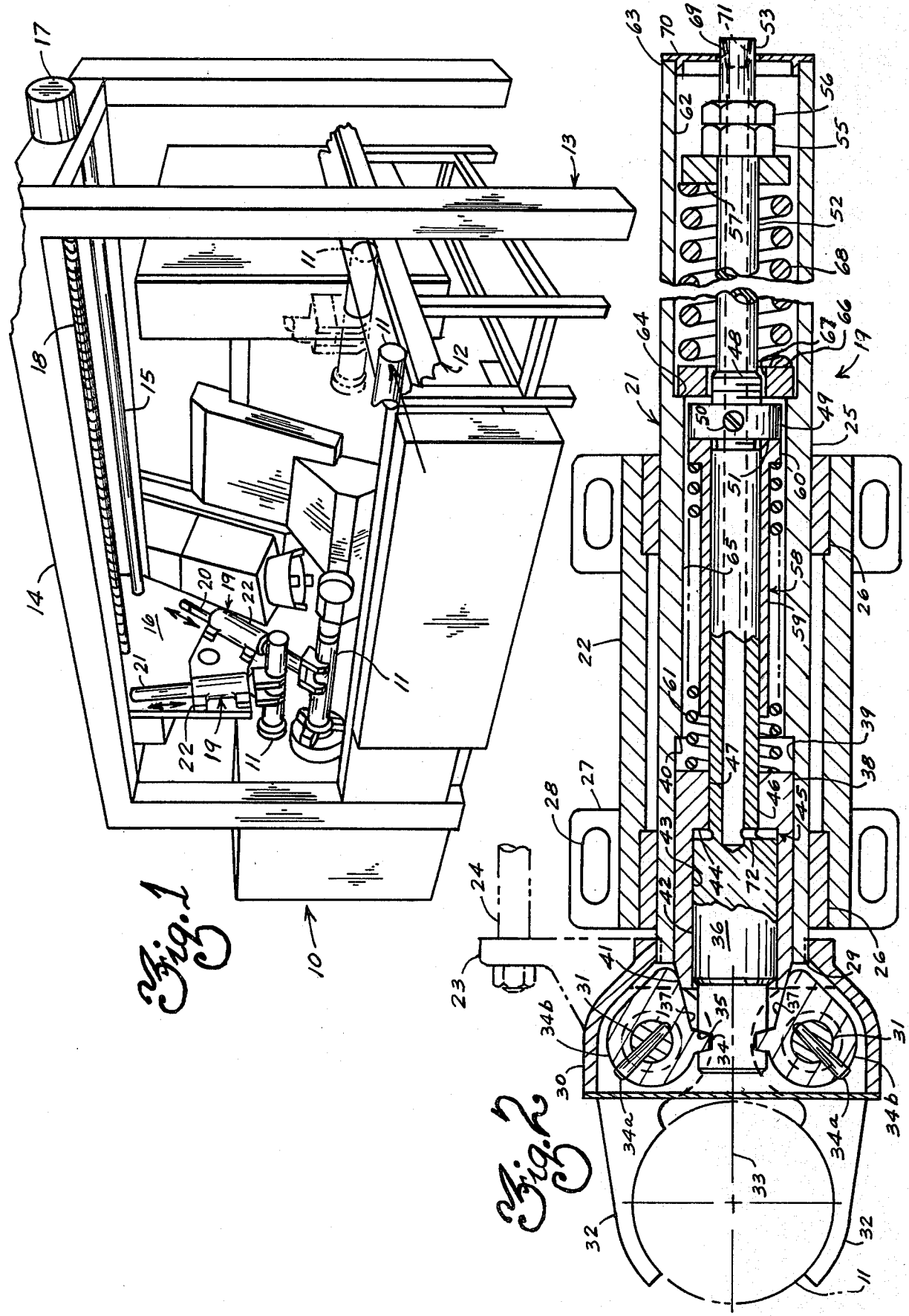

4,348,044

ARTICLE GRIPPING APPARATUS

BACKGROUND OF THE INVENTION

The invention generally relates to the field of article gripping mechanisms such as those employed for gripping workpieces or tools for transport; interchanges; etc. In particular, the invention relates to the type of gripper which may be typically employed on a machine loader or on a robot machine utilizing a gripping apparatus as its end effector.

Article grippers of the actuated finger type have been developed wherein a gripping finger or, more commonly, a pair of opposed gripping fingers are pivotally carried on a housing and are biased to a clamped position by a mechanical device such as a compression spring. At selected times, pressurized fluid is utilized to overcome the mechanical biasing force to power the fingers to an unclamped position to extract or insert an article. In some instances, the biasing clamp spring is merely an assist to a primarily power-actuated clamp element, so that in the event of a power failure a "fail-safe" mechanism is accomplished, which will retain the clamp and not drop the article.

It has been appreciated by the inventor herein, that during transport of an article which is clamped by a biasing spring or similar-type force mechanisms, unusually large momentary acceleration forces may occur which actually overcome the clamping spring force, causing an article to be loosened from its clamped state. In such event, the article may be mispositioned for subsequent operations or may, in fact, be completely dropped, causing damage.

Applicant has obviated the difficulties inherent in the prior art devices by providing a latch for an article gripper tending to make the clamp fingers irreversibly movable under the influence of external forces until such selected time as an unclamp force is applied.

It is, therefore, an object of the present invention to provide a locking type finger gripping apparatus.

Another object of the present invention is to provide a lock for a finger gripping apparatus which may be easily applied in sequence with the clamping and unclamping actuating forces.

SUMMARY OF THE INVENTION

The invention is shown embodied in an article gripping apparatus which may be moved into proximity with a part to be gripped. The apparatus has a housing carrying at least one clamp finger pivotally on the housing which is movable from an unclamped position to a clamped position and the reverse. A cooperating housing element is mounted in opposition to the clamp finger for gripping an article therebetween, and the housing element may be comprised of a similar pivotal clamp finger on the housing. A linear actuator is linkably connected through a bell crank to the pivotable clamp finger and the actuator is biased by a first "stiff" spring which reacts against the housing. When the clamp finger is in the clamped position, an interference wedge block is biased against the clamp finger by a second, "soft" spring which reacts against the actuator. The wedge block engages a locking portion on the finger to prevent the finger from opening under the influence of an external force. The actuator and wedge block are coaxial cylindrical elements, and the actuator has a piston portion which is contained in a cylinder portion of the wedge block. By internal porting through the actuator, pressurized fluid may be directed to the cylinder cavity, at which time the wedge block is first retracted from the clamp finger, overcoming the second, "soft", biasing spring. The wedge block continues in a first, rearward, direction until it contacts a fixed shoulder in the housing, at which time it "goes solid" and the actuator piston is then forced in the opposite direction away from the shoulder, overcoming the first, "stiff", biasing spring, and pivoting the finger to an "open" position. Thereafter, release of the fluid pressure contained in the cylinder cavity will sequentially first re-bias the actuator and then the wedge block under the influence of the biasing springs, thus pivoting the finger to a "closed" position and locking it.

BRIEF DESCRIPTION OF THE DRAWINGS

FIG. 1 is a perspective view of a machine employing a loader having an article gripping apparatus of the present invention.

FIG. 2 is a section through the article gripping apparatus of the present invention.

DESCRIPTION OF THE PREFERRED EMBODIMENT

Figure 3:
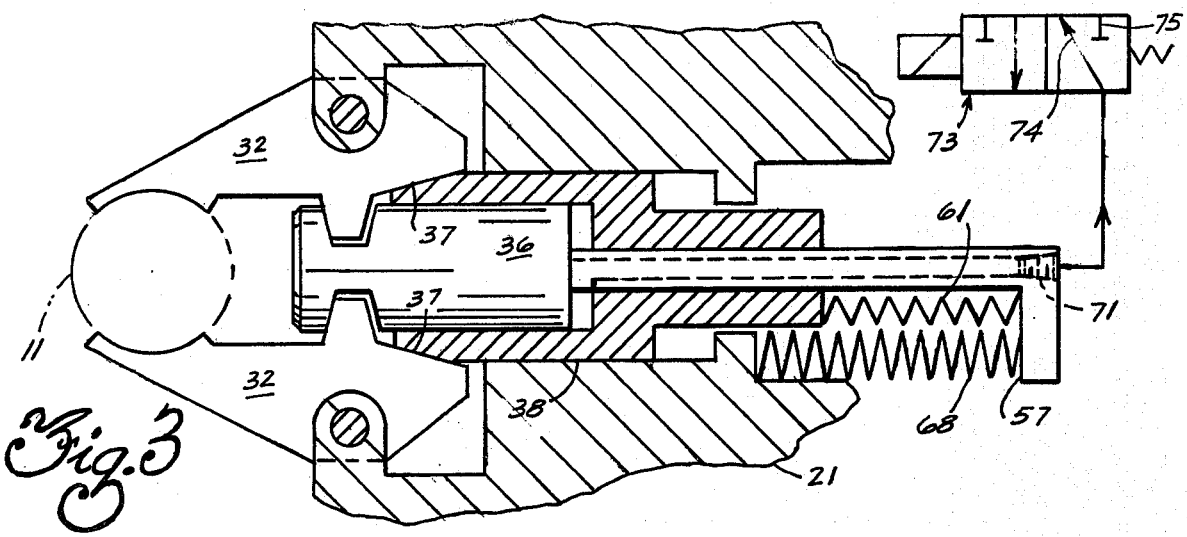
FIG. 3 is a diagramatic view of an article gripping apparatus of the present invention.

Referring to FIG. 1 of the drawings, there is shown a machine tool such as a turning machine 10 for machining workpieces 11 of rotation. The workpieces 11 are interchanged with the machine tool and a conveyor assembly 12 located at the end of the machine 10 by means of a typical shaft loader 13 which generally comprises a structure having an overhead frame 14 with a way system 15 and a loader slide 16 which may be positioned along the way system 15 by the motor 17 and screw 18 shown. The loader slide 16 carries a pair of article gripping assemblies 19 which act as operator "hands" to lift a finished workpiece 11 from the machine 10 and insert a rough workpiece 11 in the machine. The finished workpiece 11 is thereafter carried to the end of the machine 10 to be deposited on the conveyor assembly 12 and, at such time, a rough workpiece 11 is selected from the conveyor assembly 12 and shuttled back to the machining zone for a subsequent interchange. The article gripping assemblies 19 are provided with positioning cylinders 20 to linearly move the assembly 19 in the direction of the arrows. However, here it may be appreciated that if the article gripping assembly 19 of the present invention is attached to the end-effector of a robot arm such as that shown in U.S. Pat. No. 4,068,536, the positioning cylinder may be dispensed with since the robot arm may be articulated to present the gripped workpiece to its final position. Thus, the loader 13 depicted in FIG. 1 does not comprise part of the present invention, and generally represents a state-of-the-art technique.

The article gripping assembly 19 has a housing 21 which contains the gripping mechanism, and in applications where the assembly 19 is mounted to an articulated arm, such as that of a robot, the housing 21 is configured to be directly fastened to the robot arm. However, for the specific application shown in FIG. 1, the housing 21 is depicted as a cylindrical barrel, which is slidably carried in a loader support block 22, wherein a yoke 23 (see FIG. 2) is attached to both the movable housing 21 and the piston 24 of the stationary positioning, cylinder 20, so that the housing 21 may be conveniently advanced and retracted in the direction of the arrows.

The section of FIG. 2 through one of the gripping assemblies 19 of FIG. 1 shows that the barrel-shaped diameter 25 of the gripper housing 21 is slidably carried in a pair of bearings 26 in the support block 22. The support block 22 has a plurality of lugs 27 with adjusting slots 28 which are fastened to the loader slide 16 by screws (not shown). The front end 29 of the gripper housing 21 is threaded, and has a finger housing 30 (shown integral with the yoke 23) threadably received thereon so that the two 21,30 are carried as a single unit. (The use of "front" and "rear" terminology herein is used only to orient the reader with the drawing, and has no relevance to the spatial orientation of the gripper assembly). The finger housing 30 carries a pair of pivot pins 31 journalled for rotation therein, and a pair of clamp fingers 32 are secured to the pivot pins 31. The clamp fingers 32 are contoured to fit a selected workpiece 11, and are oppositely-disposed about the central axis 33 of the housing 21 to provide opposing diametral forces when the workpiece 11 is gripped. The clamp fingers 32 each have a bell crank portion 34 affixed to their respective pivot pins 31 by pins 34a and extending toward one another, and the crank portion 34 is configured as a stubby tapered tooth which is received in a cooperating tapered groove 35 of a linear actuator 36 and having a body 34b encircling the pivot pin 31. The linear actuator 36 is coaxially movable along the central axis 33 of the assembly 19, so that the actuator 36 is linkably connected to the clamp fingers 32. When the linear actuator 36 is moved along its axis 33, the movement is therefore converted by the bell crank portion 34 into equal and opposite radial clamp forces of the fingers 32 acting on the workpiece 11. A tapered surface 37 extends from the base of the crank portion 34, forming a rearwardly-diverging angle with the central axis 33 of the assembly 19. A cylindrical interference wedge block 38 is axially-supported for movement in a front bore 39 of the gripper housing 21. The bore 39 extends to a front interior shoulder 40 of the housing 21. The wedge block 38 has a leading taper diameter 41 capable of engaging the tapered surfaces 37 of the clamp fingers 32 when the wedge block 38 is urged in a forward direction. The linear actuator 36 has a piston portion 42 journalled for sliding movement with a cylinder bore 43 in the forward end of the interference wedge block 38. The cylinder bore 43 extends to a terminal shoulder surface 44 within the wedge block 38 to form an expansible pressure chamber 45. The actuator 36 has a first reduced-diameter shaft portion 46 extending rearwardly from the piston portion 42 through a bore 47 in the wedge block 38, and the first shaft portion 46 terminates at a threaded mid-section 48 which has a collar 49 threadably received thereon and locked with a set screw 50, forming a first shoulder 51 on the actuator 36. The linear actuator 36 has a second reduced-diameter shaft portion 52 extending from the threaded mid-section 48, terminating at a still further reduced threaded end section 53. The actuator 36 receives a disc element 54 which is retained on the second shaft portion 52 by jam nuts 55,56, thus forming a second shoulder 57 on the linear actuator 36. The first shaft portion 46 of the linear actuator 36 has a sleeve 58 received thereon which has a tubular portion 58 with a large head 60 abutting the first shoulder 51 of the actuator 36. A front compression spring 61 having an initial preload is disposed between the head 60 of the sleeve 58 and the wedge block 38 so that the wedge block 38 will be urged forwardly away from the shoulder 51 of the actuator 36. The tubular portion 59 of the sleeve 58 closely matches the inside diameter of the compression spring 61 to prevent buckling of the spring 61. The gripper housing 21 has a rear bore 62 extending from the rear end 63 of the housing 21 to a rear interior shoulder 64. A clearance bore 65 is provided through the housing 21, extending from the rear bore 62 to the front bore 39. A thrust disc 66, having a clearance hole 67 drilled therethrough is received over the linear actuator 36 and located against the rear interior shoulder 64 of the housing 21. A rear compression spring 68 is preloaded and disposed between the second shoulder 57 of the linear actuator 36 and the thrust disc 66, so that the linear actuator 36 is thereby urged in a rearward direction away from the housing shoulder 64. Therefore, it may be seen that the rear spring 68 tends to bias the actuator in a rearward direction, relative to the housing 21, urging the clamp fingers 32 to a "closed" or clamped position. Similarly, it may be seen that the wedge block 38 is urged in a forward direction by the front spring 61, relative to the linear actuator 36, thus locking the clamp fingers 32 in the closed position.

The end section 53 of the actuator 36 extends through a clearance hole 69 in a cover 70 which is pressed into the rear bore 62 of the housing 21, and a fluid port 71 extends axially through the linear actuator 36 to a cross-drilled hole 72 in the first shaft portion 46 of the actuator 36 which is in communication with the expansible fluid chamber 45. The fluid port 71 is connected to a hydraulic valve 73 (see FIG. 3) to provide pressurized fluid to the port 71 or, alternatively, to connect the port 71 to an exhaust line.

The rear spring 68 is very stiff, when compared to the relatively soft front spring 61, to cause the proper sequence of operations to result from the application of pressure through a single fluid port. To illustrate an example of parameters which might be employed, and the action resulting therefrom, assume: (a) cylinder and piston net area equals 1.62 sq. inches; (b) fluid pressure 800 psi.; (c) front spring K=75 pounds per inch—100 pounds preload; (d) rear spring K=600 pounds per inch—800 pounds preload. Using the above parameters, when fluid pressure is applied to the pressure cavity 45, a thrust force of 1296 pounds is created (800 psi.×1.62 sq. in.), serving to force the piston portion 42 and wedge block 38 apart. Initially, as pressure is building up in the fluid cavity 45, the wedge block 38, held relative to the linear actuator 36 by the soft front spring 61, will tend to move away from the stiffly held piston portion 46, overcoming the front spring 61 until the wedge block 38 "goes solid" against the front interior shoulder 40 of the housing 21. At this point, the wedge block 38 is fully retracted from the clamp fingers 32. As pressure continues to build up in the fluid cavity 45, the linear actuator 36 will then tend to move in a forward direction away from the now-stationarily-held wedge block 38 thus compressing the rear spring 68 between the second shoulder 57 on the actuator and the housing thrust disc 66. The forward movement of the linear actuator 36 causes bell crank reversal, moving the clamp fingers 32 to an "open" or unclamped position. Pressure must be maintained to keep the fingers 32 open. At such time it is desired to clamp a workpiece 11, fluid pressure is merely relieved, and the following sequence of events will occur: (a) the stiff rear spring 68 will first pull the bell crank portion 34 and clamp fingers 32 to a "closed" position, and: (b) thereafter, the relatively soft front spring 61 will urge the wedge block 38 into locking engagement with the clamp fingers 32.

Figure 4:
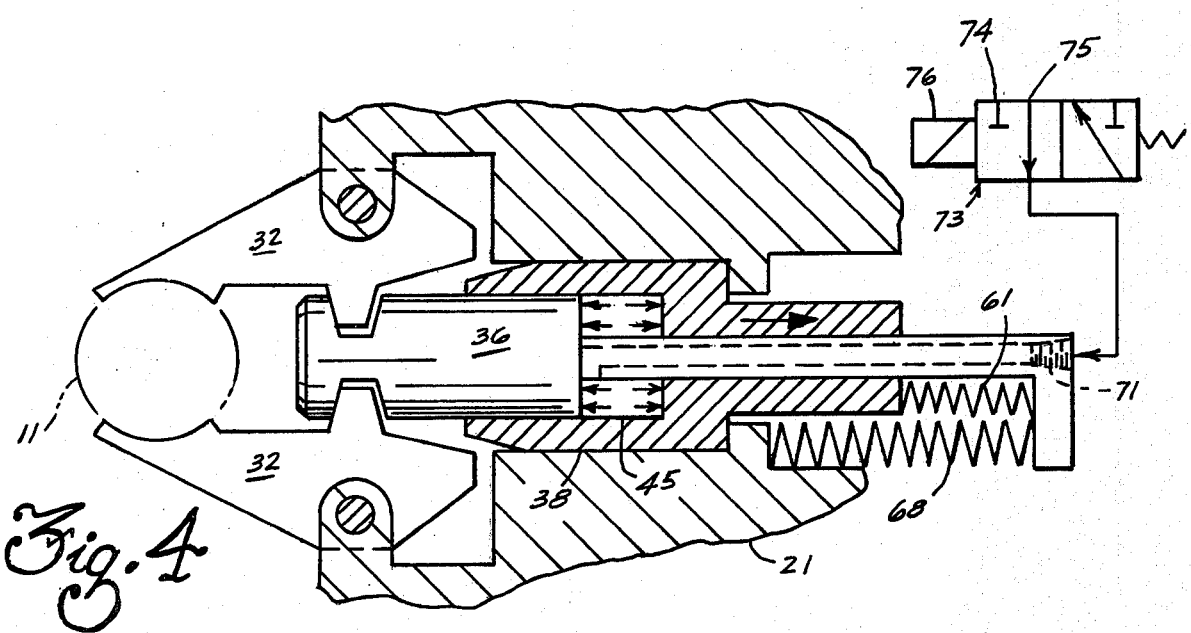
FIG. 4 is a diagramatic view of the elements of FIG. 3 immediately after initial application of fluid pressure.
Figure 5:
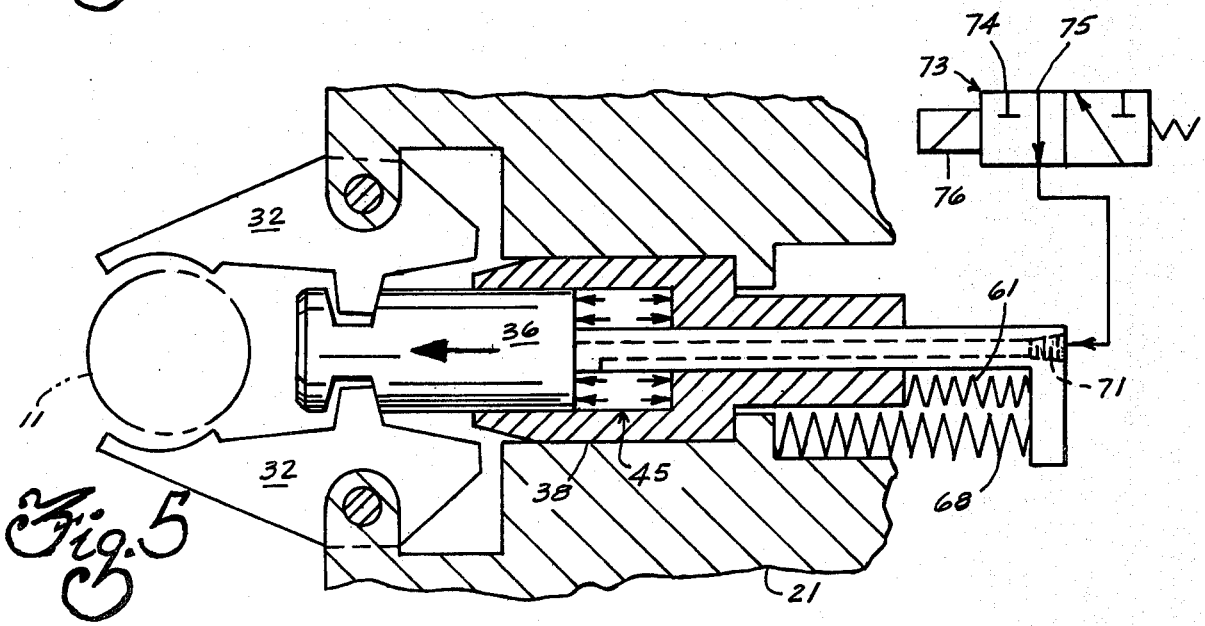
FIG. 5 is a diagramatic view of the elements of FIG. 3 immediately after a final application of fluid pressure.

FIGS. 3, 4 and 5 illustrate the function of the gripper apparatus in diagrammatic form. FIG. 3 illustrates that the stiff rear spring 68 reacts between the relatively fixed gripper housing 21 and a shoulder of the linear actuator 57, thus biasing the clamp fingers 32 to a closed position. The soft front spring 61 reacts between the movable interference wedge block and the linear actuator 36, to urge the wedge block 38 into locking engagement with the tapered surfaces 37 of the clamp fingers 32. The fluid port 71 is shown connected to a solenoid-operated/spring-return hydraulic valv 73e, wherein the normal position is to connect the fluid port 71 to an exhaust or tank line 74, and the pressure line 75 of the fluid valve 73 is shown in a blocked condition.

FIG. 4 illustrates the position of the elements immediately after the fluid valve 73, solenoid 76 is energized, thus connecting the pressure line 75 to the fluid port 71 of the linear actuator 36. At such time, the immediate pressure build-up in the fluid chamber 45, causes rearward movement of the wedge block 38 and disengagement from the clamp fingers 32, overcoming the relative soft biasing force of the front spring 61. The wedge block 38 moves rearwardly until it contacts the front interior shoulder 40 of the gripper housing 21.

FIG. 5 illustrates the condition of the elements immediately after the condition of FIG. 4, wherein continuation of the pressure build-up in the fluid chamber 45 causes the linear actuator 36 to move in a forward direction, away from the now stationarily-held wedge block 38, overcoming the relatively stiff rear spring 68 and cranking the clamp fingers 32 to an open position. As previously stated, pressure must be maintained to keep the clamp fingers 32 open, and after pressure is relieved by dropping the signal to the solenoid 76, the normal condition of the valve 73 is restored as in FIG. 3, and fluid is permitted to exhaust to the tank as the springs 61,68 begin to work in sequence. Initially, the relatively stiff rear spring 68 will bias the linear actuator 36 in a rearward direction, clamping the fingers 32 on the workpiece 11, and, thereafter, the relatively soft front spring 61 will bias the wedge block 38 in a forward direction relative to the linear actuator 36 thus locking the clamp fingers 32 in a closed position.

It is not intended to limit the invention to the specific embodiments shown herein, but rather, the invention is contained in all such similar designs and modifications as come within the scope of the appended claims.

What is claimed is:

1. An article gripping apparatus, comprising in combination:
   (a) a housing;
   (b) at least one clamp finger movable on said housing from an unclamped position to a clamped position and the reverse;
   (c) means for opposing said clamp finger and gripping an article therebetween;
   (d) an actuator supported in said housing for moving said clamp finger to said clamped position and the reverse;
   (e) first biasing means for biasing said actuator relative to said housing in a first predetermined direction;
   (f) an interference block engageable with said finger when said actuator is biased in said direction;
   (g) second biasing means for biasing said interference block relative to said actuator in a second, predetermined finger-engaging direction; and
   (h) means for overcoming said second and first biasing means.

2. The apparatus of claim 1 wherein said finger is pivotally carried by said housing.

3. The apparatus of claim 1 wherein said first and second biasing means comprise springs and wherein said first spring is stiffer than said second spring.

4. The apparatus of claim 2 wherein said means for overcoming said second and first biasing means does so in sequence, to initially overcome said second spring then finally overcome said first spring.

5. The apparatus of claim 1 wherein said first predetermined direction causes movement of said clamp finger to said clamped position.

6. The apparatus of claim 1 wherein said means for overcoming said second and first biasing means comprises a fluid actuator.

7. An article gripping apparatus, comprising in combination:
   (a) a housing;
   (b) a pair of oppositely disposed clamp fingers pivotally carried by said housing; and movable from an unclamped position to a clamped position, and the reverse;
   (c) a locking portion on at least one of said fingers;
   (d) an actuator connected to said fingers and movable with respect to said housing;
   (e) a first, relatively stiff biasing spring reacting against said actuator and said housing to bias said fingers to a clamped position;
   (f) an interference block engageable with said locking portion and movable with respect to said actuator;
   (g) a second, relatively soft biasing spring reacting against said interference block and said actuator to bias said block into a locking engagement with said finger; and
   (h) fluid actuating means for first moving said block relative to said actuator and thereafter moving said actuator relative to said housing, to overcome said second and first springs serially.

8. The apparatus of claim 7 wherein said fluid actuating means comprises in part, a piston connected to one of said actuator and said block, and a cylinder connected to the other of said actuator and said block.

* * * * *